United States Patent [19]

Redman et al.

[11] 3,962,657

[45] June 8, 1976

[54] BROADBAND DATA MODULATION SYSTEM

[75] Inventors: Charles M. Redman; Ronald W. Moore, both of Las Cruces, N. Mex.

[73] Assignee: The United States of America as represented by the Secretary of the Army, Washington, D.C.

[22] Filed: Oct. 22, 1974

[21] Appl. No.: 516,942

[52] U.S. Cl. .............................. 332/7.51; 250/199; 350/162 R; 178/6
[51] Int. Cl.² .................... H01S 3/00; H04B 9/00; G02F 1/28
[58] Field of Search ........... 332/7.51; 250/199, 216; 350/161, 162 R; 343/17.1; 356/5, 28; 73/432 L; 178/6

[56] References Cited
UNITED STATES PATENTS

| 3,365,581 | 1/1968 | Tall et al. | 350/161 |
| 3,565,514 | 2/1971 | Bate et al. | 350/161 |

OTHER PUBLICATIONS

Gottlieb, "Opto–Acoustic Signal Processors for Extending Radar System Capabilities," 2/74, pp. 21–27, Optics & Laser Tech.

Primary Examiner—Nelson Moskowitz
Attorney, Agent, or Firm—Nathan Edelberg; Robert P. Gibson; Saul Elbaum

[57] ABSTRACT

A broadband data modulation system for the transmission of amplitude and frequency modulation data with a bandwidth up to and greater than 500 MHz. The system involves the multiple heterodyning of microwave signals with infrared or optical signals. The data modulation system utilizes multiple passes of the infrared or optical signal through a crystalline material which also has an acoustic signal forming an acousto-optic grating. Fixed gratings are also imbedded in the crystal so as to aid in the guidance of the infrared or optical signal. The output of the crystal comprises an infrared or optical signal modulated with the desired data, which can be transmitted optically to a transponder, which can in turn convert the last-named infrared or optical signal into a transmitted correspondingly modulated RF signal.

9 Claims, 6 Drawing Figures

IR / MICROWAVE TRANSPONDER

5 PASS

3 PASS

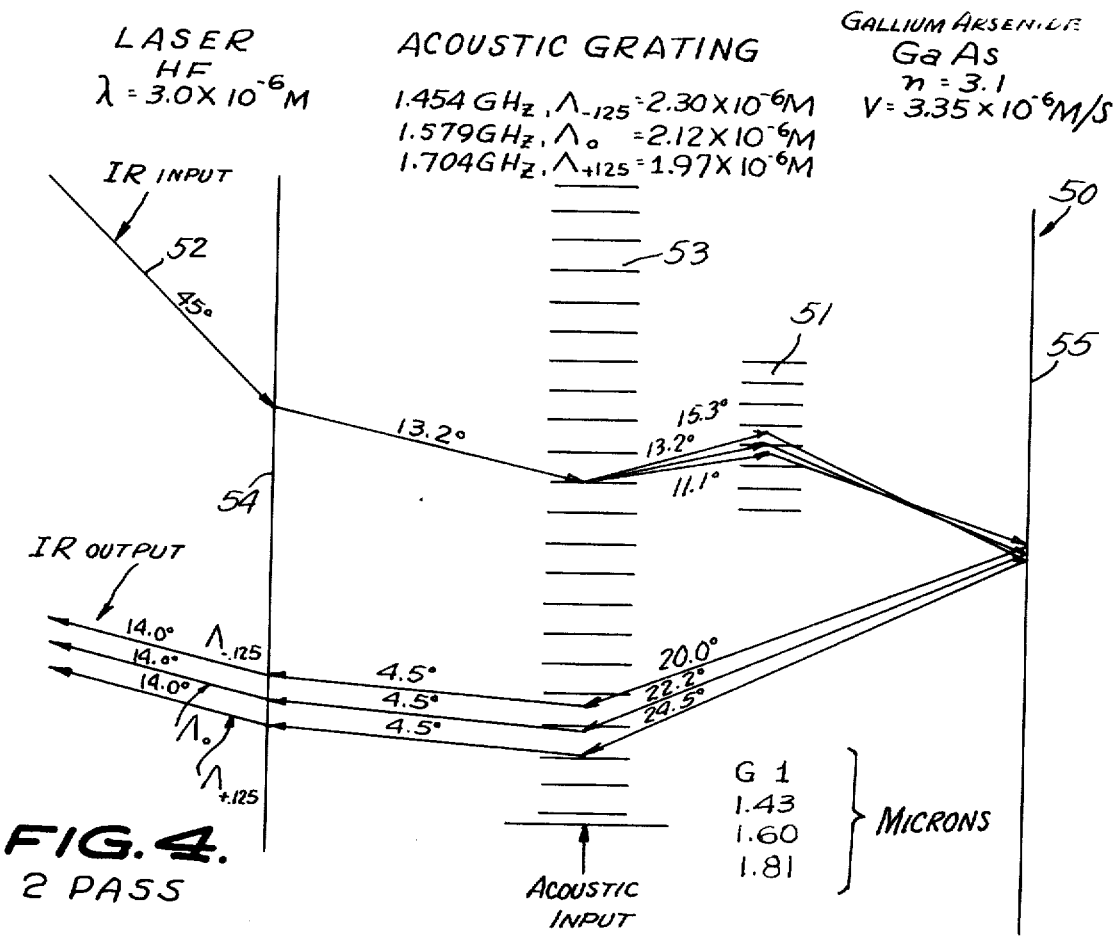
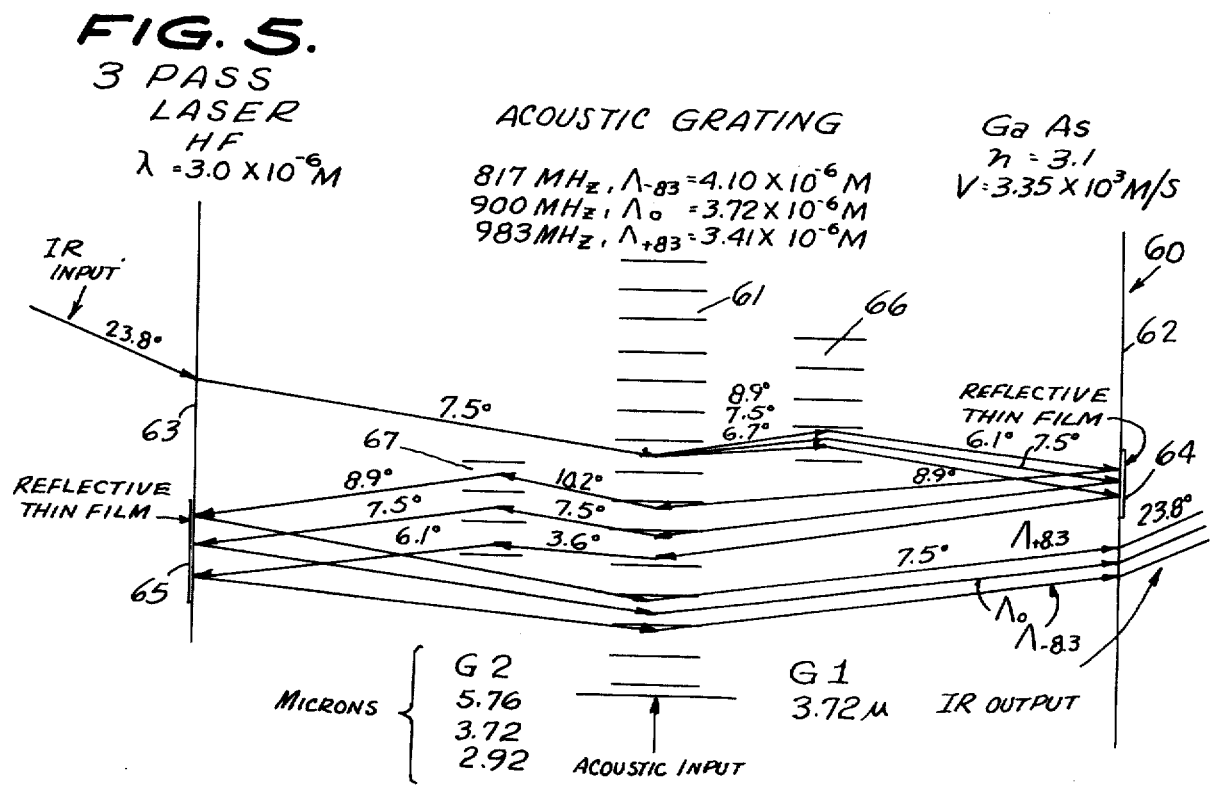

BROADBAND DATA MODULATION SYSTEM

RIGHTS OF THE GOVERNMENT

The invention described herein may be manufactured, used, and licensed by or for the United States Government for governmental purposes without the payment to us of any royalty thereon.

BACKGROUND OF THE INVENTION

This invention relates to modulation systems, and more particularly to a broadband data modulation system employing at least one acousto-optical modulation element.

The broadband data modulation system of the present invention is intended for the transmission of amplitude and frequency modulation (AM and FM) data with a bandwidth up to and greater than 500MHZ. This system, as an example, may be employed to relay radar-type data with pulsed bandwidths of up to and greater than 30MHz and pulse-to-pulse frequency diversity of up to and greater than 500MHz. The system of the present invention involves the multiple heterodyning of microwave signals with infrared or optical signals, hereinafter referred to as "IR" signals.

The system of the present invention is further related to the simulation of radar-type signals reflected from aircraft, missiles, chaff, rain, and any other general clutter which may be capable of causing signal reflections. Radar basic frequencies lie normally in a range between 1 and 18GHz, and the system of the present invention contemplates a combination of heterodyne-conversion and frequency division to frequencies and bandwidths which can be processed so as to simulate radar-to-target ranges, target signature, radial doppler, and the effects of space environment on radar signals. The system of the present invention is further intended to be employed under conditions wherein the complexity of the radar transmissions is too great to allow complete reforming of the radar signal band only on radar synchronizing pulses.

SUMMARY AND OBJECTS OF THE INVENTION

Therefore, a main object of the present invention is to provide a novel and improved broadband data modulation system for efficiently performing the functions above described.

This object is achieved by multiple passes of an IR signal through a crystalline material upon which is also impressed an acoustic signal, forming an acousto-optic grating, and which also has fixed gratings imbedded therein so as to aid in the guidance of the IR signal.

Further objects and advantages of the invention will become apparent from the following description and claims, and from the accompanying drawings.

BRIEF DESCRIPTION OF THE DRAWINGS

FIG. 4 is a schematic diagram of a 2-pass acousto-optic modulator according to the present invention.

FIG. 5 is a schematic diagram of a 3-pass acousto-optic modulator according to the present invention.

DETAILED DESCRIPTION OF THE INVENTION

In testing and evaluating radar systems it is necessary to simulate very realistically to the radar the flights of aircraft and missiles that the radar is to sense and keep track of. To realistically simulate aircraft and missile azimuth and elevation angles in space, a very large array of RF transmitters is necessary, to transmit toward the radar the simulations of the aircraft and missile radar reflections. Communicating these simulations to the large array of RF transmitters is difficult and requires special circuits and subsystems.

Figure 1:
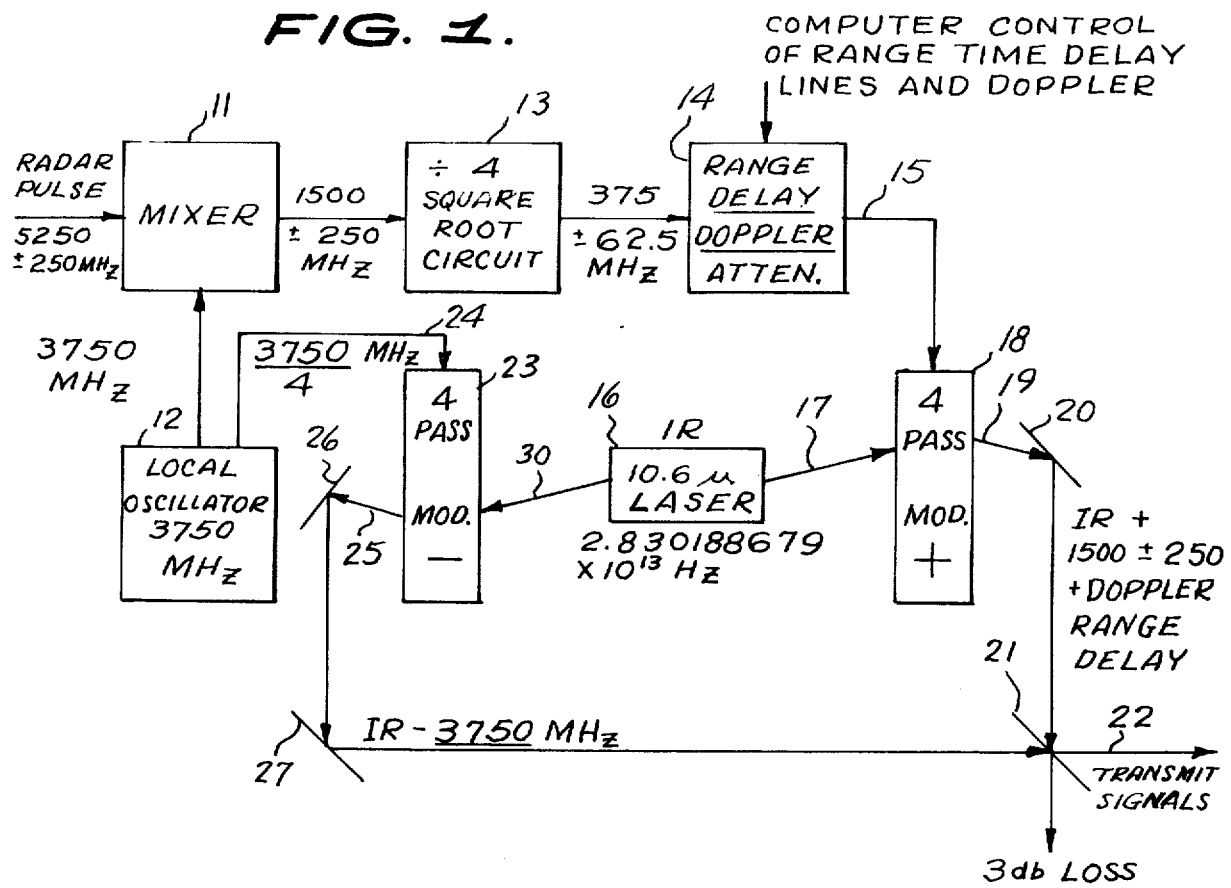
FIG. 1 is a simplified block diagram of a system and circuit for simulating radar data for transmission as IR signals to RF transmitters, said circuit employing broadband modulation devices according to the present invention.

FIG. 1 shows in simplified block form a typical system to process the actual radar transmissions to provide the desired simulation data for transmission to the array of RF transmitters. Radar pulses typically 5250 plus or minus 250MHz are heterodyned in a mixer 11 with the continuous wave 3750MHz output from a local oscillator 12 to derive difference pulses at 1500 plus or minus 250MHz which are divided by a square root circuit 13 and are delivered as 375 plus or minus 62.5MHz pulses to a range-delay, doppler, attenuation processing circuit 14, which is computer-controlled to modify the 375 plus or minus 62.5MHz input pulses to delay them in time according to the desired simulated radar-to-aircraft range, set the signal level to correspond to the desired simulated range and aircraft size, and add a doppler signal in proportion to the desired simulated radial velocity of the aircraft. The signals at 15 comprising the modified pulses from the device 14 cover a wide band width, and with standard prior technique it is difficult to satisfactorily transmit the signals to the large array of RF transmitters. There are too many transmitters in the array to allow transmitting these signals by cables. RF carriers are not feasible, as the antenna patterns cannot be suitably focused on to the array. It is, therefore, necessary to perform the communication with an IR (or optical) carrier.

Designated at 16 is an optical carrier source, such as a $CO_2$ laser, which is one of the best such sources currently available, from the standpoints of efficiency, cost, power capacity and quality of continuous wave signals. This laser provides 10.6 micron radiation. Modulation of the 10.6 micron laser radiation with radar signals in the upper microwave frequencies and very broadband widths is difficult, and it is necessary to employ acousto-optic modulators for this purpose. Prior art designs of such modulators fail to satisfactorily carry the necessary center frequency or band width. However, acousto-optic modulators according to the present invention, to be subsequently described herein, provide the required performance.

In the typical system shown in FIG. 1, IR laser beam 17 is passed through a 4-pass acousto-optic crystal modulator 18, according to the present invention, arranged for heterodyne addition, to which is applied the output pulses 15 from the device 14, thereby modulating the IR beam so that the output laser beam at 19 has a frequency of the IR beam at 17 plus 1500 plus or minus 250MHz plus the doppler-range-delay pulse modifications introduced by the device 14. Beam 19 is reflected by a first plane mirror 20 to a semi-transparent inclined mirror 21, from which it is again reflected to form part of an IR transmission beam 22. Another beam 30 from laser 16 passes through a second 4-pass acousto-optic crystal modulator 23 constructed in accordance with the present invention, arranged for heterodyne subtraction, to which is applied at 24 a continuous wave reference signal from the local oscillator 12 which has a frequency of one-fourth the 3750MHz fundamental frequency of said oscillator (provided by an internal divider, or the like). The output beam 25 of modulator 23 thus has the frequency of the IR beam at 30 (the same as at 17) minus 3750MHz. Reference beam 25 is directed by plane mirrors 26 and 27 so as to pass through semi-transparent mirror 21 and thus combine with beam 19 to form the signal-transmission IR beam 22.

Figure 2:
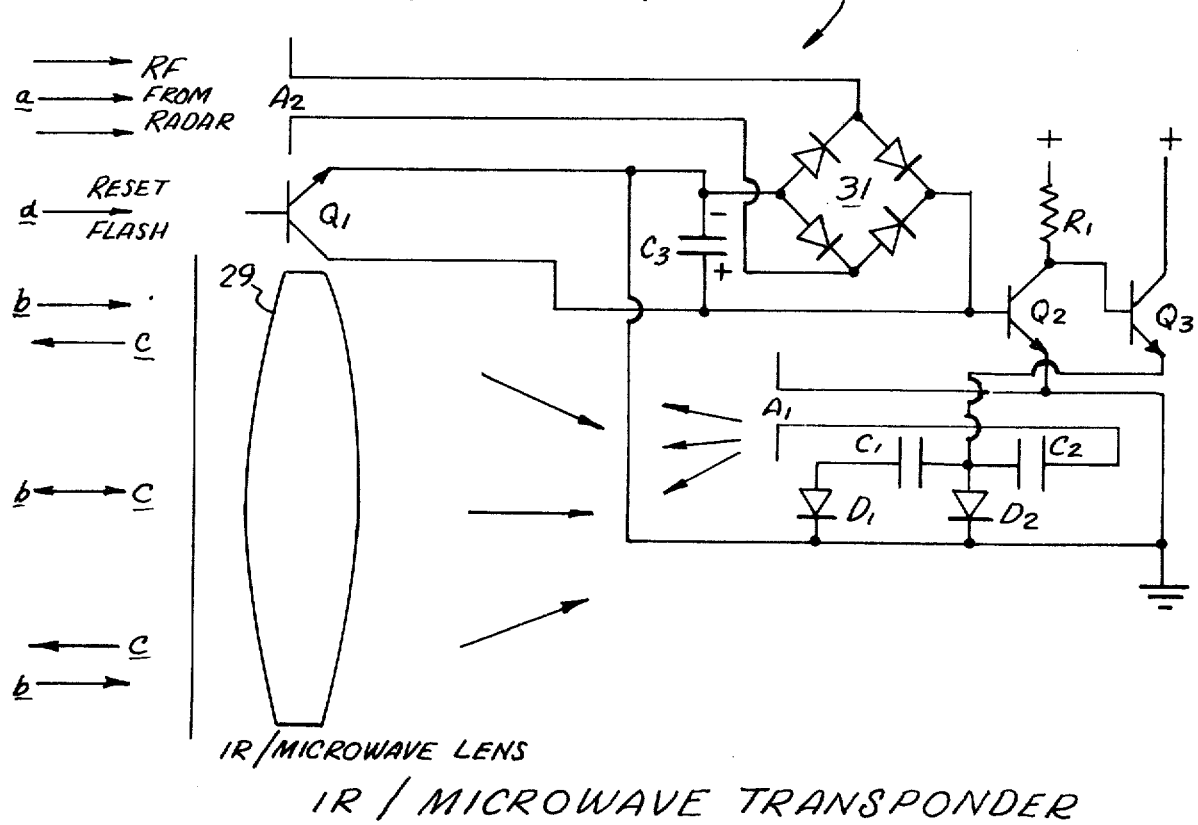
FIG. 2 is a schematic diagram of a system and circuit defining an IR/microwave transponder for receiving the broadband IR signals from the system of FIG. 1 and retransmitting corresponding microwave signals.

Referring to FIG. 2, a typical transponder 28 is disclosed which receives the combined broadband and reference IR signals and retransmits a microwave signal. The transponder 28 may be one of many similar units in a large microwave array used in the testing of complex radars or missile systems. The transponder is intended to provide a microwave output signal simulating the reflection signal obtained from an object located in the radar space field. The parameters of this intended signal are determined by the simulating system comprising device 14 and its computer control. The basic function of an angle-simulating test array including the many transponders 28 is to receive radar type signals in the form of frequency and amplitude differentials as between two IR signals (laser beams 19 and 25) and retransmit microwave signals which are identical to or very similar to radar signals as reflected from aircraft, missiles, chaff cloud, ground terrain, and other objects that may be located in the radar space. The two IR beams (forming beam 22) are coaxial and may be pointed at the test array by means of computer-controlled galvanometer mirrors. A typical angle simulating test array would cover an angular space with respect to the radar of 120° in azimuth and 90° in elevation and be located on a section of a hemisphere with a radius of about 100 feet, with the radar at the center.

The coaxial IR signal beams carry radar signals which have been processed in a radar target simulator, similar to the system of FIG. 1, where radar-to-target range delay, range attenuation, amplitude type of target signature, radial velocity doppler, and similar information has been added. The galvanometer-directed IR beams in conjunction with the angle simulating test array add angular position and angular target signature to the signals and convert them to the radar frequency.

In the typical transponder 28 of FIG. 2, $a$ designates the RF radiation from the radar, $b$ designates the two incoming coaxial IR signal beams (forming composite beam 22 respectively comprising the IR simulator beam 19 of a frequency of about 28300 plus 1.75GHz and IR reference beam 25 of a frequency of about 28300 minus 3.7GHz), $c$ designates the microwave output response transmitted to the radar, of a frequency of about 5.45 plus or minus 0.25GHz (the heterodyne difference between beams 19 and 25), and $d$ designates a reset flash, presently to be described.

The two coaxial IR signals (forming beam 22) are focused by an IR/microwave lens 29 so as to illuminate the photodiode $D_1$. Diode $D_1$ is normally a PIN type; however, other types of diodes or similar devices may be employed. The function of diode $D_1$ is to heterodyne the two IR signals and develop the corresponding differential microwave signal. In the above typical case, the reference IR signal is 28300 minus 3.7GHz and the data IR signal is 28300 plus 1.75 plus or minus 0.25GHz. The difference frequency is therefore 5450 plus or minus 0.25GHz. Other IR and microwave frequencies can be utilized, depending upon what microwave frequencies the radar under test utilizes and what IR signal source (laser) and modulator are used.

In the circuit system of FIG. 2, capacitors $C_1$ and $C_2$ isolate diode $D_2$ from diode $D_1$ so that current can be passed through diode $D_2$ without affecting other elements in the microwave circuits. $D_2$ may also be a PIN diode, and is used to attenuate the microwave signal at said difference frequency proportionally to the current through it. The microwave signal detected in diode $D_1$ and attenuated in diode $D_2$ is furnished through capacitor $C_2$ to antenna $A_1$ and radiated (as microwave output signal $c$) back through the IR/microwave lens 29. Antenna $A_1$ is preferably a broadband spiral antenna to allow using the transponder 28 with a variety of radars. Diode $D_1$ is normally mounted at the center of antenna $A_1$. The lens 29 would not normally be expected to have the same index of refraction for both IR and microwave frequencies. The lens 29 and diode $D_1$ must be mounted so as to focus the IR radiation to a point on diode $D_1$. The lens 29 and antenna $A_1$ must be so located that the microwave signal is in an essentially flat wave front at the radar antenna approximately 100 feet distant. Fringing of the microwave signal at the edge of the lens may be reduced by the use of an absorber cone around the transponder 28 to absorb the portion of the microwave signal not passing through the center portion of the lens. The lens 29 may be made of inexpensive material such as molded plastic.

There are two control circuits required with a transponder 28 when used as an element of an angle simulation test array as above described: (1) an antenna $A_2$, receiving radiation from the radar (signal $a$), is connected across a bridge rectifier 31 and develops a voltage across a capacitor $C_3$ proportional to the magnitude of the radar signal $a$ striking antenna $A_2$. This signal voltage, buffered through transistors $Q_2$ and $Q_3$, controls the current through diode $D_2$ so as to attenuate the microwave signals detected by diode $D_1$ inversely in proportion to the level of the radar transmission $a$. This control therefor senses the magnitude of the radar transmission, memorizes it, and inversely controls the attenuator $D_2$. This causes the angle simulator test array to memorize the radar antenna pattern on a transmission-by-transmission basis. 2) This memory must be erased just prior to each radar transmission, and this is accomplished by a control circuit including a phototransistor $Q_1$ connected across capacitor $C_3$ which receives an optical or IR flash ($d$) just prior to the timing of the radar transmission, causing said phototransistor $Q_1$ to decrease its impedance to a very low value.

Thus, the focused multiple coaxial IR beams $d$ carrying information and data as difference frequency and amplitude are received by the heterodyning diode $D_1$ in a circuit where the differences are detected, amplitude-controlled or attenuated, and retransmitted back through the focusing system.

Acousto-optic modulators must operate close to the relationship:

$$\sin \theta = \lambda/2\Lambda$$

where $\theta$ is the angle the IR signal enters the transparent material used for the modulator, $\lambda$ is the IR wavelength in air, and $\Lambda$ is the wavelength of the acoustic signal in the crystal. It can be seen that as $\lambda$ becomes shorter, $\Lambda$ can also become shorter, but the shorter wavelength lasers lack the necessary power and are very inefficient.

The data modulation devices of the present invention are multiple-pass devices to allow the use of the more efficient long wavelength lasers.

Multiple-pass acousto-optic modulators require RF inputs which have frequencies and amplitudes which are inversely proportional to the number of IR passes through the modulators. A square root circuit such as is shown at 13 in FIG. 1 provides this function.

The system illustrated in FIG. 1 employs 4-pass modulators 18, 23. The modulators presently to be described in detail are multiple-pass modulators operating on the same general principles as the 4-pass modulators 18, 23.

Figure 3:
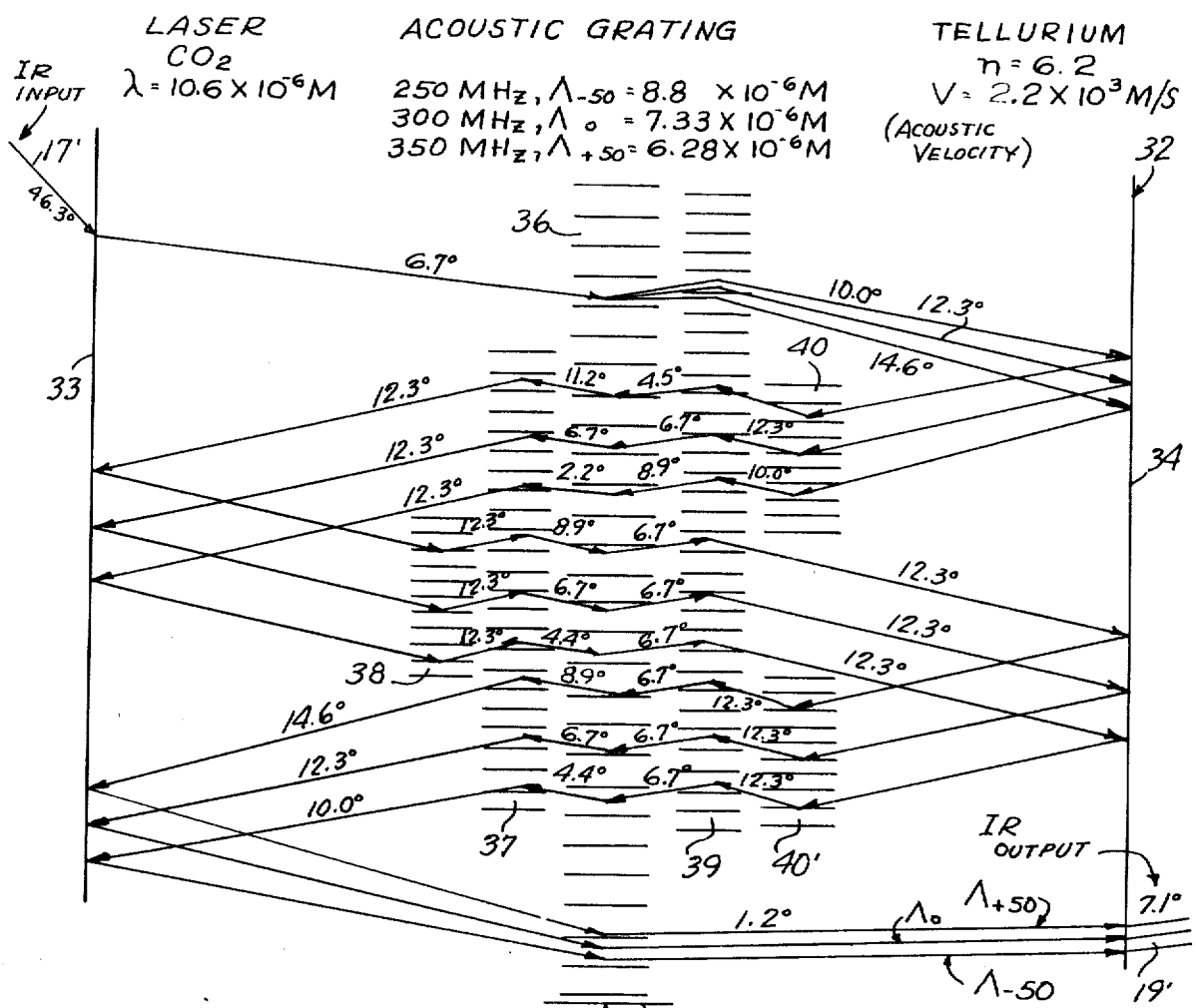
FIG. 3 is a schematic diagram of a 5-pass acousto-optic modulator, according to the present invention, which may be employed in a system such as that shown in FIG. 1.

FIG. 3 is a diagrammatic representation of a 5-pass acousto-optic modulator and illustrates one variation of a data modulation device according to the present invention. The device, designated generally at 32, comprises a Tellurium crystal having the polished opposite sides 33 and 34 and including electrode means at 35 for applying a broadband radar signal which has been frequency-divided by five. By transducing this signal, the crystal forms an acoustic grating 36 between the IR input and output crystal surfaces 33 and 34. The crystal is provided with four sets of fixed gratings, two sets being arranged on each side of and parallel with signal acoustic grating 36, to guide the IR signal. At the left side of the acoustic grating 36, as viewed in FIG. 3, are the continuous fixed gratings 37 and 38 and at the right side of acoustic grating 36 are the continuous fixed grating 39 and the set of spaced fixed gratings 40, 40' having a gap therebetween. The polished opposite sides 33 and 34 allow reflection and refraction of the IR input signal, for example, the input singla shown at 17'. The modulated IR output signal in this case is shown at 19'. In this example, the input one-fifth frequency radar signal is 300 plus or minus 50MHz, optimized for a Tellurium modulator and a $CO_2$ laser with $10.6 \times 10^{-6}$M radiation. The 300 plus or minus 50MHz is also an excellent frequency band for processing through acoustic delay lines.

The Bragg angle for Tellurium, $10.6 \times 10^{-6}$M IR radiation and 300MHz is 46.3°. An angle close to 45° optimizes the performance of the modulator. The index of refraction for Tellurium is 6.2 and that of air is 1.0. Refraction of the IR signal conforms to the following equation:

$$n \sin \theta = n \sin \theta'$$

where $n = 1$, $\theta = 46.3°$, $n = 6.2$ and $\theta'$ is the angle of refraction. Therefore $\theta' = 6.7°$ In the absence of an acoustical modulation signal, the IR beam would be first deflected at fixed grating 39 at an angle of 12.3° up and to the right of grating 39. Spacing between the lines of grating 39 is 5.19 microns and is chosen to assure that the IR beam will be reflected when it strikes the polished side 34 of the crystal. The equation given above is employed to determine the minimum angle which reflects rather than refracts. Reflection takes place when the equation gives an exit angle greater than 90°. The example illustrated in FIG. 3 utilizes a transduced radar signal of one microsecond duration whose center frequency (1/5 of the required radar frequency) is 300MHz. When the transduced acoustic signal reaches the IR signal (at the acoustic grating 36) it causes the IR signal to be deflected upwardly 6.7° for 300MHz, 4.5° for 350 MHz, and 8.9° for 250MHz. Other frequencies between the extremes will cause deflections correspondingly. The angular deflection caused by the gratings conforms to the equation:

$$\lambda/6.2 = \Lambda, (\sin \theta_1 + \sin \theta_1')$$

where $\theta_1$ is the wavelength of the IR signal in air, $\Lambda$, is the spacing of the grating lines (corresponding to the acoustic signal wavelength mentioned previously). $\theta$ is the angle of incidence and $\theta_1'$, is the exit angle from the grating. Fixed grating 39 now causes the IR signal to deflect downward 10° for 350 MHz, 12.3° for 300MHz, and 14.6° for 250 MHz. This first pass of the IR signal through the crystal causes the frequency of the IR signal deflected by the acoustic grating to increase by 300 + 50MHz. The amplitude of the deflected IR signal is proportional to the amplitude of the acoustic signal. An IR signal whose amplitude is inversely proportional to the magnitude of the acoustic signal is not deflected by the acoustic grating and is, therefore, deflected up by fixed grating 39 instead of down.

The IR beam reflects at the polished surface 34 according to the angle of incidence. In this example, because of the acoustic frequency band of 100MHz the angle varies from 10° to 14.6°. These angles are incorrect for allowing continuity of the IR beam through several more passes through the crystal. The short section of fixed grating 40 along with a second pass through fixed grating 39 realigns the IR beam to the desired 6.7° for a 300MHz acoustic signal. A 350MHz acoustic signal causes the angle to be 4.5°, which is too small, and a 250MHZ signal causes it to be 8.9°, which is too great. The errors in angle caused by all frequencies except the center frequency must be corrected to contain IR signal dispersion and allow the final exit angle from the crystal to be constant with frequency change. This correction is accomplished at fixed grating 37. The spacing of the lines of this grating is tapered so as to correct for the dispersion caused by the bandpass of the acoustic signal. The taper in the example shown in FIG. 3 is from 4.19 to 6.81 microns for the first and third passes through the grating, as they correct for two passes through the acoustic grating 36. The taper for the second pass is from 4.64 to 5.89 microns because it corrects for only one pass through the acoustic grating 36. Utilizing three tapered sections in grating 37 is merely an example. Corrections can be made with two tapered sections, or possibly even with only one tapered section.

The second pass through the acoustic grating 36 adds another 300 ± 50MHz to the IR signal, and this sequence is repeated 5 times in all to add 5 times 300 ± 50MHz. The fixed gratings 37, 38, 39, 40, 40' are designed to always pass the IR signal into the acoustic grating 36 at 6.7° when the acoustic signal is at 300MHz. Other frequencies cause angular errors which are corrected at fixed grating 37. The IR direction must always have a vector opposite to the vector velocity of the acoustic signal to allow addition of frequency.

Fixed grating 37 is designed to cause the IR beam to exit from the acoustic grating 36 the fifth time at 1.2° for any acoustic frequency between 250MHz and 350MHz. This angle, being well under 10 degrees, is low enough to allow little or no reflection, and the IR beam exits from the crystal at an angle of 7.1° at the face 34. The IR beam 19' exits from the crystal at frequencies from 1250MHz to 1750 MHz higher than the frequency of the entry beam 17', depending on the instantaneous frequency of the acoustic signal. This is a 0.00442% to 0.00618% increase in frequency. The difference between the input of 28,300GHz (10.6 × $10^{-6}$ M line) and the output of 28,300 + 1.5 ± 25GHz is the radar frequency, and the amplitude of the output frequency is the amplitude of the radar signal.

FIG. 4 is a diagrammatic representation of a two-pass acousto-optic modulator according to the present invention, shown generally at 50. It is designed to carry the same bandpass as the modulator 32 of FIG. 3 but at a center frequency of about 3.158GHz instead of 1.5GHz. It utilizes a HF laser input, radiating a 3.0 × $10^{-6}$ M line, and comprises a gallium arsenide crystal having only one fixed grating 51. The fixed grating 51 has a tapered line spacing, the taper being from 1.43 × $10^{-6}$ M to 1.81 × $10^{-6}$ M to correct for the frequency-dependent angular dispersion of the IR signal, shown at 52, passing through the acoustic grating, shown at 53. The modulator 50 has the opposite polished sides 54 and 55, and the IR beam 52 enters at 45° to the side 54. A second modulator identical to that of FIG. 4 but with the direction of propagation of the acoustic signal reversed will furnish an IR output signal lower than the input IR signal 52 by 3.158GHz. One of the two modulators can be driven by a fixed frequency continuous wave (CW) signal (similar to the modulator 23 in FIG. 1) to develop a reference IR signal. The difference frequencies could be adjusted for radars in the frequency band of 6.066GHz to 6.566GHz.

Figure 6:
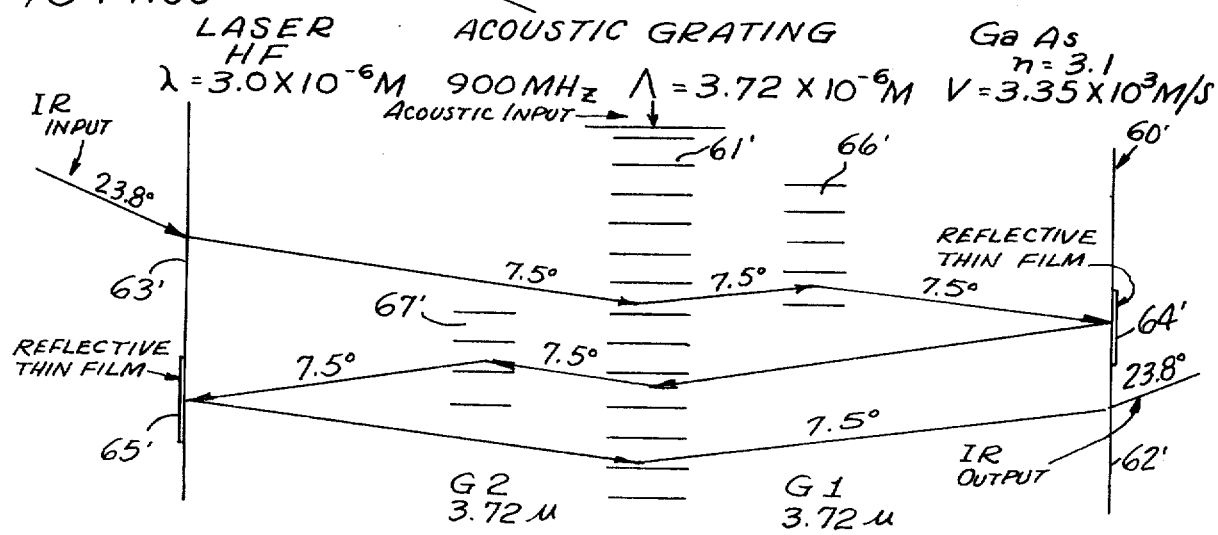
FIG. 6 is a schematic diagram of a 3-pass acousto-optic modulator similar to FIG. 5, but which is suitable to be employed therewith as a reference modulator.

FIGS. 5 and 6 are diagrammatic representations of a 3-pass acousto-optic modulator 60 and a corresponding 3-pass acousto-optic reference modulator 60'. The HF laser 3.0 × $10^{-6}$ M line and GaAs crystals are used. Each pass angle through the acoustic gratings, shown respectively at 61 and 61', is optimized for best results. This causes the angle of the IR beam at the respective crystal sides 62, 63 and 62', 63' to be too small for reflection, and therefore respective pairs of thin film mirrors 64, 65 and 64', 65' are employed at the sides 62, 63 and 62', 63' to cause reflection. The modulators 60 and 60' employ respective sets of fixed gratings 66, 67 and 66', 67' for IR beam guidance.

The acousto-optic modulator 50 of FIG. 4 is optimized for the first pass of the IR beam 52 through the acoustic grating 53 but not for the second pass. This allows for a large enough angle at the side 55 of the crystal to cause reflection.

The acousto-optic modulator 60 of FIG. 5 handles radar data in the band from 2.45GHz to 2.95GHz. By adding the reference modulator 60' of FIG. 6, radar data in the band of 5.15GHz to 5.65GHz can be processed.

The four detailed designs of acousto-optic modulators shown in FIGS. 3, 4, 5 and 6 show that there is great flexibility in multiple passing of the IR beam through the acoustic grating. There are trade-offs between acoustic frequency, laser frequency, crystal type, and IR detection of heterodyning. The acoustic frequency should normally be low and the number of multiple passes high for optimum processing of radar-type data prior to the modulator. Heterodyne detection frequency may be limited by the state-of-the-art, so should be kept low. This could require 3 IR coaxial beams with two as references. Both the input IR and output IR beams of FIG. 6 might be utilized to furnish references at 100,000GHz and 99,997.3GHz. This would require first heterodyning the 2 reference IR beams to obtain a 2.7GHz reference, and heterodyning the high frequency IR with the signal IR to obtain 2.7GHz ± 0.25GHz. The 2.7GHz and 2.7GHz ± 0.25GHz would be added in a microwave circuit to obtain 5.4GHz ± 0.25GHz.

The width of the IR beam limits the frequency response of the acousto-optic modulators. The beam should be narrow. However, when used with pulsed radar data, it only handles the frequencies in one pulse at a time. A frequency-agil radar may operate over a 500MHz band, but may have only 30 MHz bandwidth in any one pulse. The number of passes that the IR beam makes through the acoustic grating is also frequency response-limiting. Different passes of the IR beam are deflected by different sections of the acoustic signal. For some purposes this is objectionable. However, where simulation of radar reflections is involved, multiple passes can be used to partially simulate the range time dimension of the radar target.

We wish it to be understood that we do not desire to be limited to the exact details of construction shown and described, for obvious modifications can be made by a person skilled in the art.

What is claimed is:

1. A system for transmitting data over a wide bandwidth comprising an acousto-optical transparent crystal, a high frequency signal source with sidebands adapted to contain such data, means to apply said signal source to said crystal in a manner to form an acoustic grating in the crystal, a source of optical radiation providing a coherent optical beam, means for directing said optical beam through said crystal in a manner to traverse said acoustic grating a plurality of times and then emerge from the crystal which comprises means for correspondingly modulating the beam radiation with a bandwidth in accordance with the number of passes of the beams through the acoustic grating, and means to demodualte the emerging modulated beam, said crystal being provided with fixed grating means located to guide the optical beam through the acoustic grating.

2. The system of claim 1, and wherein the crystal includes reflective means at a side face thereof for reflecting the optical beam back toward the acoustic grating.

3. The system of claim 1, and wherein the crystal has at least one polished side face oriented to internally reflect the optical beam back toward the acoustic grating.

4. The system of claim 1, and wherein the crystal is provided with a mirror element at a side thereof located to internally reflect the optical beam back toward the acoustic grating.

5. The system of claim 1, and wherein the crystal includes reflective means at a side face thereof located to reflect the optical beam back toward the acoustic grating, and wherein the crystal is provided with fixed grating means located to guide the optical beam in a path including the acoustic grating.

6. The system of claim 5, and wherein said fixed grating means includes a series of parallel fixed linear elements in the crystal with a tapered spacing therebetween to correct for frequency-dependent angular dispersion caused by the bandpass of the acoustic grating.

7. The system of claim 5, and wherein said fixed grating means includes a plurality of sets of parallel fixed linear elements at spaced locations in the crystal with tapered spacings therebetween to correct for frequency-dependent angular dispersion caused by the bandpass of the acoustic grating.

8. A modulator comprising an acousto-optic transparent crystal adapted to form an acoustic grating therein responsive to the application thereto of a high frequency electrical signal, said crystal having an entry surface for an optical beam, means on the crystal arranged to reflect an optical beam entering at said entry surface internally through the crystal so that it passes a plurality of times through said acoustic grating, whereby to modulate the optical beam with data from said electrical signal with a bandwidth in accordance with the number of passes of the optical beam through the acoustic grating, the crystal including fixed means arranged to guide the optical beam through the acoustic grating, and a beam exit surface on the crystal.

9. The modulator of claim 8, and wherein said fixed means includes a grating comprising a series of parallel fixed linear elements in the crystal with a tapered spacing therebetween arranged to correct for frequency-dependent angular dispersion caused by the bandpass of the acoustic grating.

* * * * *